United States Patent [19]

Raichle et al.

[11] Patent Number: 5,672,922
[45] Date of Patent: Sep. 30, 1997

[54] COMMUTATOR MOTOR

[75] Inventors: Dieter Raichle; Günter Haas, both of Nürtingen, Germany

[73] Assignee: Karl M. Reich Maschinenfabrik GmbH, Nurtingen, Germany

[21] Appl. No.: 374,875

[22] Filed: Jan. 19, 1995

[30] Foreign Application Priority Data

Jan. 21, 1994 [DE] Germany .............. 44 01 686.7

[51] Int. Cl.⁶ .................................. H02K 11/00
[52] U.S. Cl. .................. 310/68 A; 310/50; 388/937; 318/280; 81/469
[58] Field of Search ................... 310/50, 68 A, 310/47; 318/280, 283, 286, 257; 388/937; 81/469, 57.11

[56] References Cited

U.S. PATENT DOCUMENTS

| | | | |
|---|---|---|---|
| 2,500,571 | 3/1950 | Reynolds | 310/230 |
| 2,543,789 | 3/1951 | MacMillian | 318/286 |
| 2,554,506 | 5/1951 | Schwarz | 310/68 A |
| 2,701,857 | 2/1955 | Gess | 318/285 |
| 2,748,301 | 5/1956 | Spielman | 310/241 |
| 2,764,705 | 9/1956 | Albertson et al. | 310/68 A |
| 3,732,476 | 5/1973 | Cairelli | 318/305 |
| 4,097,703 | 6/1978 | Houser | 200/157 |
| 4,633,156 | 12/1986 | Besson et al. | 318/696 |
| 4,995,094 | 2/1991 | Aio | 388/840 |
| 5,063,319 | 11/1991 | Mason et al. | 310/210 |
| 5,089,729 | 2/1992 | Moores | 310/50 |

FOREIGN PATENT DOCUMENTS

| | | |
|---|---|---|
| 36 38403 C2 | 8/1988 | Germany . |
| 659109 | 10/1951 | United Kingdom . |

*Primary Examiner*—Thomas M. Dougherty
*Assistant Examiner*—Jonathan Link
*Attorney, Agent, or Firm*—Wigman, Cohen, Leitner & Myers, P.C.

[57] ABSTRACT

In a non-commutating-pole commutator motor, in particular as the drive of a power hand tool, a device for reversing the direction of rotation includes a switch (8) for reversing the direction of current in the rotor winding, and a brush apparatus (4) mounted immovably in the motor casing. The rotation of the plane defined by the commutating coils is chosen in such a manner that good commutation is assured in one of the two directions of rotation at full motor output. Furthermore, the switch (8) for reversing the direction of rotation yields the preferred direction of rotation in a first switch position and the opposite direction in a second switch position. In the switch position for the preferred direction, a smaller number of turns of the field winding (1, 2) in the electric circuit of the motor is effectively provided while, in the opposite direction of rotation of the motor, a larger number of turns is effectively provided.

7 Claims, 1 Drawing Sheet

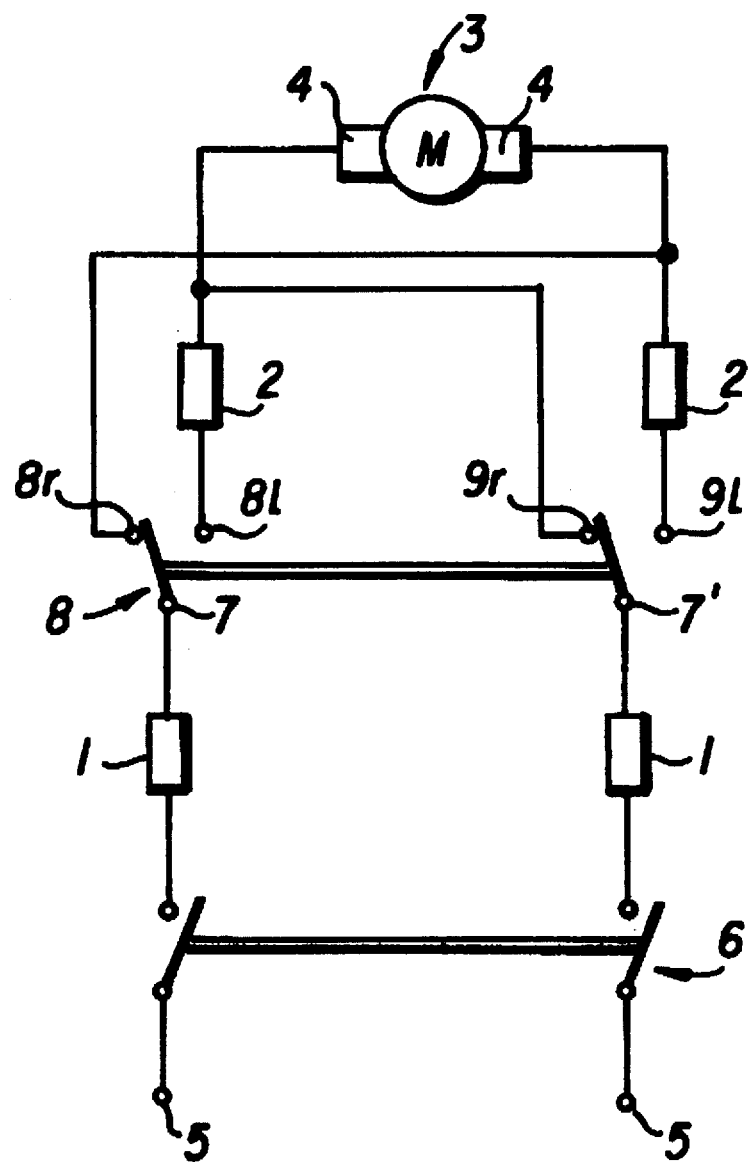

5,672,922

COMMUTATOR MOTOR

BACKGROUND OF THE INVENTION

The invention relates to a non-commutating-pole commutator motor and to hand tools which incorporate such motors.

To obtain good commutation with such motors, it is usual to arrange pairs of commutating coils in a plane, which coils are switched in the opposite direction of the rotor's direction of rotation relative to the center plane between opposite poles of the stator laminated core. This can be obtained by turning back the brush apparatus against the direction of rotation and/or advancing the connection of the coil ends to the commutator with respect to the rotor center plane. In the opposite direction of rotation, however, the commutation is very poor, so that the motor cannot be effectively operated in this direction of rotation.

If such a commutator motor is used as the drive motor of a hand tool machine, it must be possible to reverse the direction of rotation, as for example, to rotate screws in and out. An acceptable power-for-size ratio can be obtained only if the brush apparatus is staggered when the direction of rotation is reversed. For both directions of rotation, the commutating coils are brought into a position with respect to the main field, which is produced by the field windings, in which a good commutation can be obtained. That is, in the conventional non-commutating-pole motor, the field windings on the stators are fixed and the rotor windings can be envisioned as formed on a series of planes through the axis, each plane being uniformly disposed from the previous plane according to the number of rotor windings. One of these planes, usually lying parallel to the stator poles, is called the center plane for reference purposes. The brushes connecting power to the commutator sectors normally lie in this central plane. To accommodate changes in direction in which the rotor is rotated on the axis, the brushes may be advanced with the direction of rotation of the rotor from the center plane, or the brushes may be turned back against the direction of rotation, from the center plane. Such devices for reversing the direction of rotation are complicated.

OBJECTS AND SUMMARY OF THE INVENTION

A primary object of the present invention is to provide a non-commutating-pole commutator motor, where the additional complexity for reversibility of the direction of rotation is reduced.

Another object of the present invention is to provide a non-commutating-pole commutator motor which avoids the problems of conventional devices.

Still another object of the present invention is to provide hand tools with motors having good commutation in the preferred direction of rotation even with maximum output.

Other objects and advantages of the present invention will become apparent from the description which follows.

By turning back the brush apparatus against the direction of rotation and/or advancing the connection of the coils of the rotor winding in the direction of rotation with respect to the center plane of the commutator, the commutating coils can be positioned for good commutation in a preferred direction of rotation. Moreover, good commutation can still be obtained in the opposite direction of rotation since, for this direction of rotation, the increased number of turns of the field winding results in a higher resistance of the field winding and a reinforced magnetic flux, two features that facilitate the commutation. The same also applies to the decrease in speed resulting from the reinforcement of the magnetic flux. Although full motor output is available only in the preferred direction of rotation, this factor is acceptable in many applications. For example, a power screwdriver requires less torque to unscrew the screw than for screwing in the screws. According to the present invention, a rotatable brush apparatus is replaced with stationary brushes to provide a non-complicated solution to prior art devices.

According to the present invention, the field winding is to be designed in such a manner that it can be operated with varying numbers of turns, such that a simple switch can be used which also allows reversal of the current direction in the rotor. Furthermore, the motor can be better utilized in its preferred direction of rotation than the prior art commutator motors with reversible direction of rotation. In the present invention, the motor can be designed optimally for the preferred direction of rotation both with respect to the rotor and the stator and the commutating device.

In a preferred embodiment, each of the two field winding sections mounted on the poles of the stator laminated core comprises a first coil and a second coil, of which the latter lies in the electric circuit of the motor only when the direction of rotation is opposite the preferred direction of rotation. Since, in this direction of rotation, the motor current is less than in the preferred direction of rotation, the two coils advantageously have a smaller wire diameter than the two first coils.

Preferably, the switch for reversing the direction of rotation is designed as a double pole reversing switch. Thus, the complexity of the motor is also reduced.

When such a reversing switch is used, the two first coils of the field winding can be connected, on the one hand, to the main switch, which is usually present; and, on the other hand, to the input side of the reversing switch. Of the two second coils, one end is connected to one or the other brush and the other end is connected to that connection on the output side of the reversing switch, that lies in the electric circuit of the motor when the direction of rotation opposite the preferred direction of rotation is chosen. Moreover, the two connections on the output side of the reversing switch, which lie in the electric circuit of the motor when the preferred direction of rotation is chosen, are connected in such a manner directly to the brushes that the result is an interchanged assignment of the brushes to the first coils as compared to the assignment for the direction of rotation opposite the preferred direction of rotation.

BRIEF DESCRIPTION OF THE DRAWINGS

The invention is now explained with reference to the drawing, wherein the single FIGURE is a diagrammatic representation of the circuit of a preferred embodiment.

DETAILED DESCRIPTION OF THE PREFERRED EMBODIMENT

The non-commutating-pole commutator motor of the present invention may be utilized as a universal motor and used as a drive motor, as for example, in an electric hand tool, e.g. a power screw driver. The commutator motor generally includes a motor casing (not illustrated), in which a stator laminated core (also not illustrated), which forms the two opposite poles, is rigidly mounted. Each pole carries one half of a field winding. Each of these two halves of the field winding comprises a first field coil 1 and a second field coil 2, which is separate from the first field coil 1 and whose wire has a smaller diameter than the wire of the first field coil 1. Moreover, a rotor shaft (not illustrated) of a rotor, all of which is denoted as 3, is mounted in the casing. Rotor 3 includes a rotor laminated core, wound with the rotor winding, and a commutator, to whose segments the winding ends of the individual coils forming the rotor winding are attached. Brushes 4 of a brush apparatus (not illustrated) are mounted in the motor casing, and lie on diametrical points of the commutator.

The entire motor is optimized for a direction of rotation that is considered to be the preferred direction of rotation; in the case of a power screw driver, the direction in which a screw is screwed in. In this preferred direction of rotation, therefore, a high utilization of the machine, and thus a higher output, are obtained. In particular, the optimization applies to the choice of the number of turns per unit length of the two first field coils 1 and to the specified brush displacement, which can also be achieved naturally in part or totally advanced connection of the coils of the rotor winding at the commutator.

A double pole mains switch 6, by means of which the motor is connected to the mains voltage and can be disconnected from the mains voltage, is attached to two mains supply poles 5, which can be the two male plug pins of a power plug. Naturally the mains supply voltage can also be provided by a battery. As shown in the drawing, one end of the two first field coils 1 is connected directly to the mains switch 6. The other end is attached to one or the other of the input-sided connections 7 or 7' of a double-pole reversing switch 8, whose outputs, which can be connected to the connection 7, are denoted as $8_r$ and $8_l$, whereas the outputs, which can be connected to the connection 7', are denoted as $9_r$ or $9_l$. In the switch position, which is shown in the diagram and with which the preferred direction of rotation is selected, the outputs $8_r$ and $9_r$ are connected to the connections 7 or 7'. In the embodiment, the preferred direction of rotation corresponds to a clockwise rotation of the motor. The outputs $8_l$ and $9_l$ are connected to the connections 7 or 7', when the opposite direction of rotation, thus the counterclockwise rotation, is selected.

When the preferred direction of rotation is chosen, the reversing switch 8 connects the two first field coils 1 directly to one or the other brush 4.

In the other switching position of the reversing switch 8, and thus when the output $8_l$ is connected to the connection 7 and the output $9_l$ is connected to the connection 7', the two field coils 1 are connected via the second field coil 2, mounted on the same pole of the stator laminated core, to the respective other brush 4, to which they are not directly connected in the switching position for the preferred direction of rotation. Thus, the first goal is achieved in that the motor current flows through the rotor in the opposite direction of rotation. Secondly, by connecting the first and second field coils in series, the field resistance is increased and the magnetic excitation flux is enlarged. Both the higher field resistance and the higher excitation flux contribute to the goal of reaching a useful commutation up to an output that is less, to be sure, than the maximum output in the preferred direction of rotation, but still an adequate output in the application case, even though the brushes for this direction of rotation are staggered in the wrong direction.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

We claim:

1. A non-commutating-pole commutator motor for driving a hand tool comprising:
    a) a field winding carried by poles of a laminated core stator which is mounted in a motor casing;
    b) a rotor winding attached to a commutator and having commutating coils, wherein the commutating coils of said rotor winding define a plane advanced around a longitudinal axis of said motor relative to a central plane lying in a center between opposite poles of said laminated core stator, and wherein the advanced plane is defined by the commutating coils and chosen such that, in one of two directions of rotation, good commutation is assured at full motor output;
    c) a brush apparatus non-rotatably secured in said motor casing and comprising brushes contacting diametrical points on said commutator; and
    d) switch means for reversing the direction of rotation, said switch means yielding a preferred direction of rotation in a first switch position and an opposite direction of rotation in a second switch position, and wherein said switch means applies a first number of turns of the field winding to said motor in the first switch position and a second number of turns of the field winding to an electric circuit of the motor in the second switch position, said first number of turns being less than said second number of turns;
    wherein said switch means comprises a double pole reversing switch, and said field winding comprises a first pair of coils and a second pair of coils;
    wherein said first pair of coils is connected to a main voltage and to an input side of said switch means, respectively;
    wherein said second pair of coils has one end connected to one of said brushes, and another end connected to an output of said switch means at a connection that lies in the electrical circuit of the motor when said opposite direction of rotation is chosen; and
    wherein two connections on an output side of said switch means, which lie in the electrical circuit of the motor when said preferred direction of rotation is chosen, are connected directly to the brushes, whereby there is an interchanged assignment of the brushes to the first pair of coils as compared to the assignment of the brushes for said opposite direction of rotation.

2. A motor as recited in claim 1, wherein the field winding is mounted on the poles of the laminated core stator.

3. A motor as recited in claim 2, wherein said second pair of coils lies in the electric circuit of the motor only when said opposite direction of rotation is chosen.

4. A motor as recited in claim 3, wherein said second pair of coils has a smaller wire diameter than said first pair of coils.

5. A hand tool including a motor as recited in claim 1.

6. A hand tool as recited in claim 5, wherein said hand tool comprises a power screwdriver, and wherein said preferred direction of rotation is the direction for driving in screws.

7. A hand tool as recited in claim 5, wherein said hand tool comprises a drill, and wherein said preferred direction of rotation is the direction for drilling a hole.

* * * * *